(12) United States Patent
Saladi et al.

(10) Patent No.: US 11,809,913 B2
(45) Date of Patent: *Nov. 7, 2023

(54) LOAD BALANCING OF CLONED VIRTUAL MACHINES

(71) Applicant: VMware, Inc., Palo Alto, CA (US)

(72) Inventors: Kalyan Saladi, Sunnyvale, CA (US); Ganesha Shanmuganathan, Mountain View, CA (US)

(73) Assignee: VMWare, Inc., Palo Alto, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 17/484,432

(22) Filed: Sep. 24, 2021

(65) Prior Publication Data

US 2022/0019468 A1 Jan. 20, 2022

Related U.S. Application Data

(63) Continuation of application No. 15/509,426, filed as application No. PCT/US2015/048997 on Sep. 8, (Continued)

(51) Int. Cl.
*G06F 9/50* (2006.01)
*G06F 9/455* (2018.01)

(52) U.S. Cl.
CPC .......... *G06F 9/505* (2013.01); *G06F 9/45533* (2013.01); *G06F 9/45558* (2013.01); (Continued)

(58) Field of Classification Search
CPC ................ G06F 9/505; G06F 9/45558; G06F 2009/4557; G06F 2009/45583
See application file for complete search history.

(56) References Cited

U.S. PATENT DOCUMENTS 7,925,850 B1   4/2011   Waldspurger et al.
8,151,263 B1 *  4/2012   Venkitachalam ..... G06F 9/5077
                                                       718/1

(Continued)

FOREIGN PATENT DOCUMENTS

EP        1380947 A2    1/2004

OTHER PUBLICATIONS

Lagar-Cavilla, H. Andres; et al. "SnowFlock: Rapid Virtual Machine Cloning for Cloud Computing" EuroSys'09; Nuremberg, Germany; 12 pgs.; Apr. 1-3, 2009.

(Continued)

*Primary Examiner* — Lewis A Bullock, Jr.
*Assistant Examiner* — Kevin X Lu
(74) *Attorney, Agent, or Firm* — Thomas | Horstemeyer, LLP.

(57) ABSTRACT

Disclosed herein are embodiments for managing the placement of virtual machines in a virtual machine network. In an embodiment, a method involves determining whether to separate at least one virtual machine in a set of virtual machines supporting a process and running on a first host computer from other virtual machines in the set. If at least one virtual machine is to be separated, then at least one virtual machine is selected based on a number of memory pages changed. The selected virtual machine is then separated from the other virtual machines in the set.

17 Claims, 7 Drawing Sheets

Related U.S. Application Data 2015, now Pat. No. 11,132,234, which is a continuation of application No. 14/481,832, filed on Sep. 9, 2014, now Pat. No. 9,389,901.

(52) U.S. Cl.
CPC .......... *G06F 9/5066* (2013.01); *G06F 9/5088* (2013.01); *G06F 2009/4557* (2013.01); *G06F 2009/45583* (2013.01)

(56) References Cited

U.S. PATENT DOCUMENTS

| | | | |
|---|---|---|---|
| 8,468,288 | B2 | 6/2013 | Corry et al. |
| 8,631,405 | B2* | 1/2014 | Lublin .................. G06F 9/5033 718/1 |
| 8,832,683 | B2 | 9/2014 | Heim |
| 9,116,803 | B1 | 8/2015 | Agrawal et al. |
| 9,372,726 | B2 | 6/2016 | Gopalan |
| 9,929,931 | B2* | 3/2018 | Breitgand ........... G06F 9/45558 |
| 2008/0098154 | A1 | 4/2008 | Traut et al. |
| 2008/0163239 | A1 | 7/2008 | Sugumar et al. |
| 2011/0131569 | A1 | 6/2011 | Heim |
| 2011/0145471 | A1 | 6/2011 | Corry et al. |
| 2011/0154318 | A1 | 6/2011 | Oshins et al. |
| 2011/0154331 | A1 | 6/2011 | Ciano et al. |
| 2011/0320556 | A1 | 12/2011 | Reuther |
| 2012/0239850 | A1 | 9/2012 | Qiu et al. |
| 2014/0115164 | A1 | 4/2014 | Kalyanaraman et al. |
| 2014/0196034 | A1 | 7/2014 | Amano et al. |
| 2014/0196037 | A1 | 7/2014 | Gopalan |
| 2014/0215459 | A1 | 7/2014 | Tsirkin |
| 2015/0058580 | A1* | 2/2015 | Lagar Cavilla ..... G06F 9/45533 711/149 |
| 2015/0178127 | A1* | 6/2015 | Karunamoorthy .......................... G06F 9/45558 718/1 |
| 2016/0055016 | A1* | 2/2016 | Beveridge ............. G06F 9/4451 718/1 |
| 2017/0038980 | A1 | 2/2017 | Lagar et al. |
| 2018/0329737 | A1* | 11/2018 | Dong .................. G06F 9/45558 |

OTHER PUBLICATIONS

Sun, Michael H. er al; "Fast, Lightweight Virtual Machine Checkpointing" pp. 1-6; 2010.
International Search Report, PCT/US2015/048997, dated Sep. 8, 2015.
European Search Report mailed for Application No. PCT/US2015/048997.
Wood et al., "Memory Buddies: Exploiting Page Sharing for Smart Colocation in Virtualized Data Centers", VEE'09, Mar. 11, 2009 (Year: 2009).

* cited by examiner

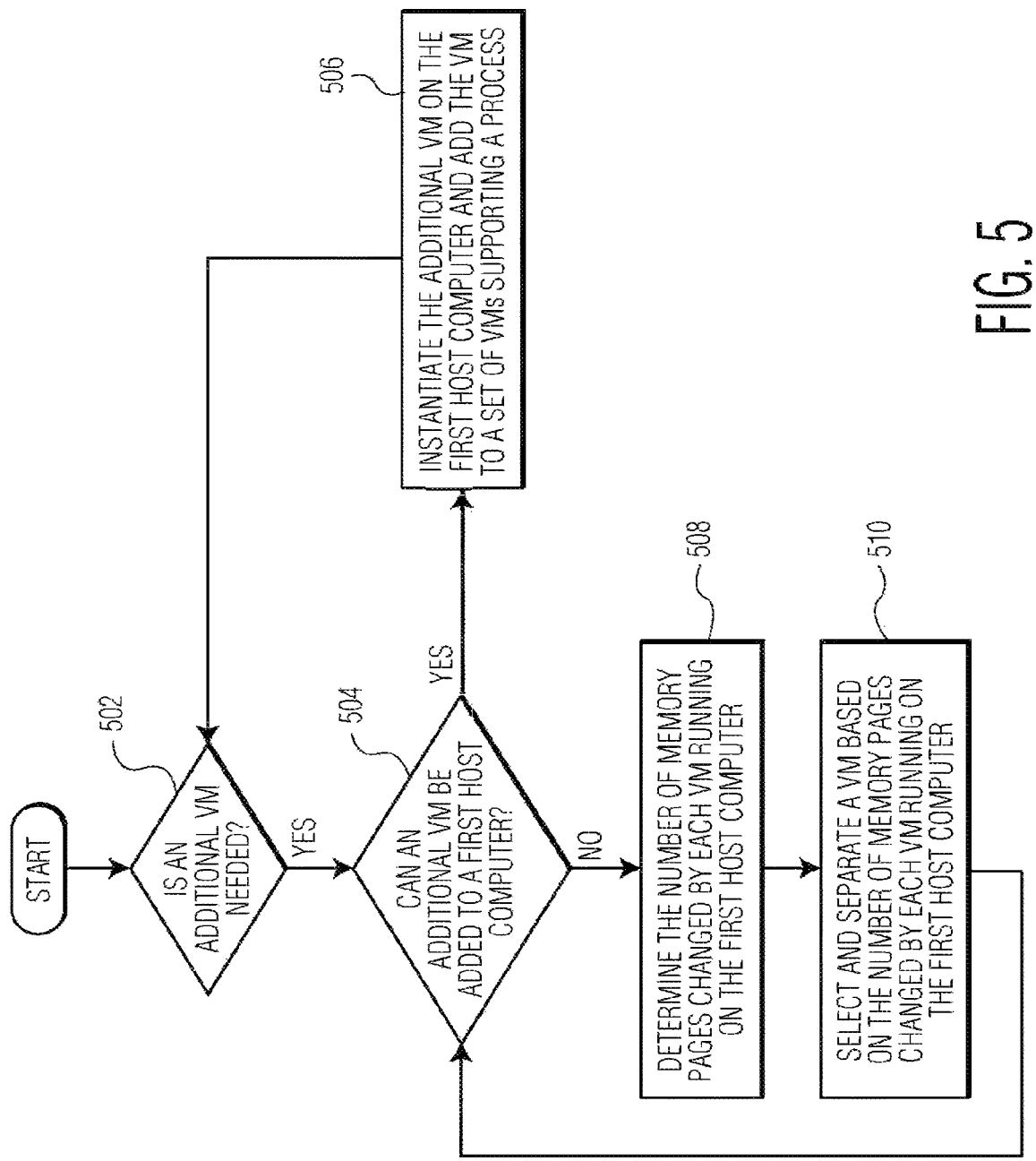

LOAD BALANCING OF CLONED VIRTUAL MACHINES

This application is a continuation of, and claims priority to and the benefit of, U.S. patent application Ser. No. 15/509,426, entitled "LOAD BALANCING OF CLONED VIRTUAL MACHINES," filed Mar. 7, 2017, now issued as U.S. Pat. No. 11,132,234, which is a national stage entry under 35 U.S.C. § 371, of International Patent Application No. PCT/US2015/048997, filed on Sep. 8, 2015, entitled "LOAD BALANCING OF CLONED VIRTUAL MACHINES," which claims priority to and the benefit of U.S. patent application Ser. No. 14/481,832, filed on Sep. 9, 2014, now issued as U.S. Pat. No. 9,389,901, entitled "LOAD BALANCING OF CLONED VIRTUAL MACHINES," all of which are incorporated by reference herein as if set forth in their entirety.

BACKGROUND

Cloud computing and virtual machine (VM) networks have greatly improved the flexibility of resource allocation to address workloads in computational centers. The flexibility is born from the ability to utilize a veritable number of physical machines and VM instances depending on the demand of the workload. Typically, when a process is started in a VM network, a process begins with a low resource demand (e.g., run on one VM). As the workload handled by the process increases, additional VMs can be instantiated to support the process as needed. For example, a simple calculation is initially supported by a single VM. When requests for the calculation begin to be made at a rate faster than the VM can perform the calculation, a second VM is instantiated to perform the calculation in parallel with the first VM.

In a typical VM network, workload can increase and decrease quickly. Therefore, rapid instantation of additional VMs is desirable. However, typically, configuration of newly instantiated VMs can be a time consuming process and often limits the responsiveness of a VM network to an increase in workload. Alternatively, a new VM (child VM) can be instantiated by cloning a VM (parent VM) already configured to support the process. By cloning a parent VM, the settings and state of the parent VM can be quickly mapped to the child VM without having to configure the child VM. Thus, new child VMs can be created with the appropriate settings and state needed by the process.

However, the creation of new child VMs places further demand on the resources utilized by existing VMs, which can negate the benefits of cloning or result in underperformance by the existing VMs. In order to manage resource utilization, VMs may need to be migrated or moved throughout the VM network. For example, if a parent VM and several child VMs instantiated on the same host computer are over-utilizing the memory available in the host computer (e.g., demanding more memory than is available), then a subset of VMs may need to be migrated to another host computer.

SUMMARY

In an embodiment, a method for managing the placement of virtual machines in a virtual machine network is disclosed. The method involves determining if at least one virtual machine in a set of virtual machines supporting a process and running on a first host computer needs to be separated from other virtual machines in the set. If at least one virtual machine needs to be separated, then at least one virtual machine is selected to be separated based on the number of memory pages changed. The selected VM is then separated from the other virtual machines in the set.

In a second embodiment, a non-transitory computer-readable storage medium is disclosed. The non-transitory computer-readable storage medium contains program instructions that, when executed by one or more processors, causes the one or more processors to determine if at least one virtual machine in a set of virtual machines supporting a process and running on a first host computer needs to be separated from the other virtual machines in the set. If at least one virtual machine in the set of virtual machines needs to be separated from the set of virtual machines, then at least one of the virtual machines from the set of virtual machines is selected based on the number of memory pages changed, and the virtual machine is separated from the other virtual machines in the set.

In a third embodiment, a computer system having at least one host computing device, the host computing device including a processor and memory for running instantiated virtual machines is disclosed. The at least one host computing device is configured to determine if at least one virtual machine in a set of virtual machines supporting a process and running on a first host computer needs to be separated from the other virtual machines in the set and, if at least one virtual machine in the set of virtual machines needs to be separated from the set of virtual machines, select at least one of the virtual machines from the set of virtual machines based on the number of memory pages changed and separate the virtual machine from the other virtual machines in the set.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 5 is a flow diagram of a technique for managing the placement of virtual machines in a virtual machine network and selecting a virtual machine to separate in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
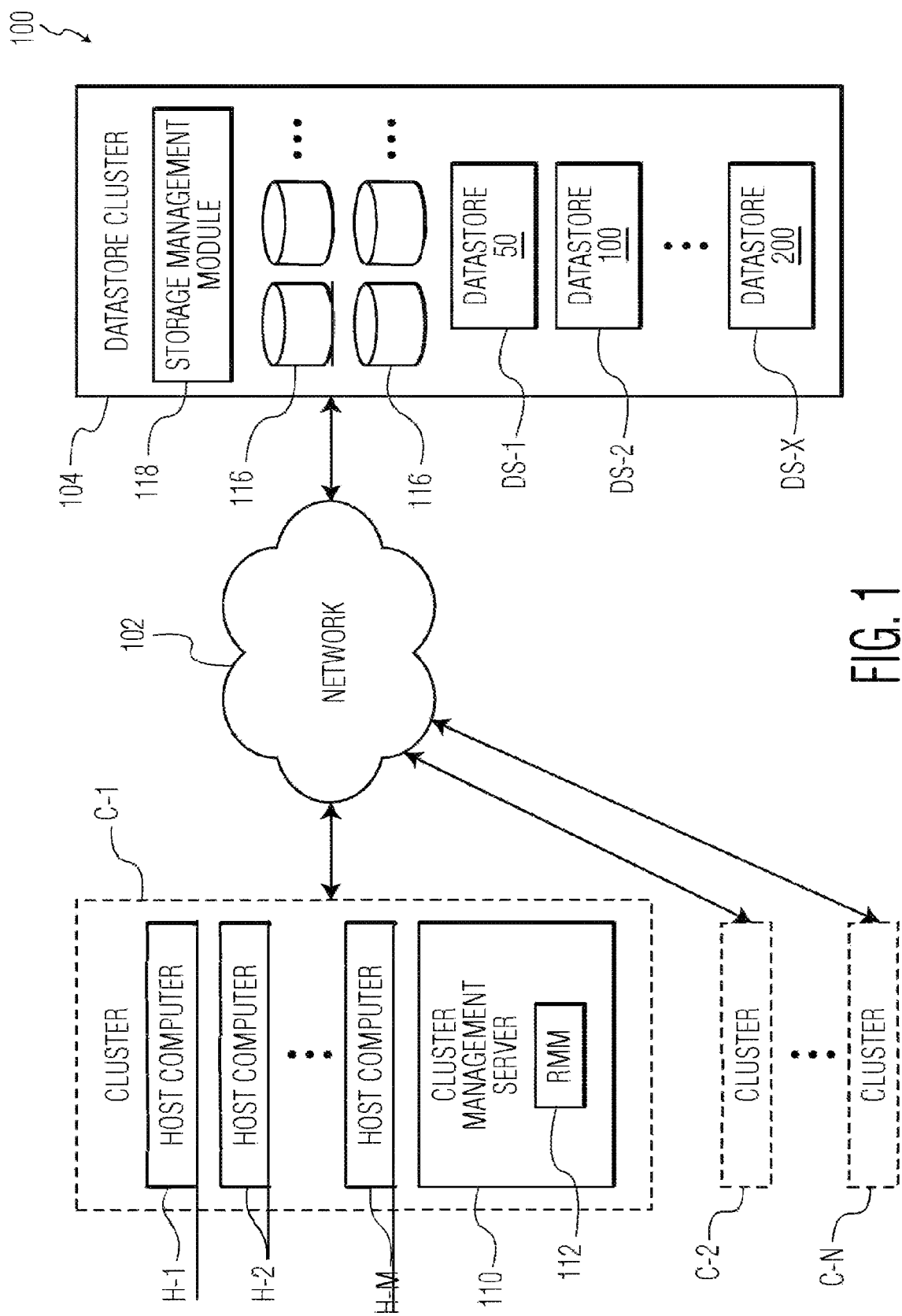
FIG. 1 is a block diagram of a virtual machine network.

Turning now to FIG. 1, a block diagram of a virtual machine network 100 (VM network) is shown. The VM network includes a network 102, clusters C-1, C-2 . . . C-N (where N is a positive integer) of host computers, and a datastore cluster 104. The exact number of host computer clusters included in the distributed computer system can be, for example, from a few clusters to tens of clusters or more. The host computers of the different clusters and the datastore cluster are connected to the network. Thus, each of the host computers in the clusters is able to access the datastore cluster via the network and may share the resources provided by the datastore cluster with the other host computers. Consequently, any process running on any of the host computers may also access the datastore cluster via the network.

In the illustrated embodiment, each of the clusters C-1, C-2 . . . C-N includes a number of host computers H-1, H-2 . . . H-M (where M is a positive integer) and a cluster management server 110. The number of host computers included in each of the clusters can be any number from, for example, one to several hundred or more. In addition, the number of host computers included in each of the clusters can vary so that different clusters can have a different number of host computers. While at least some of the host computers may be virtualized, in the embodiment of FIG. 1, the host computers are physical computer systems that host or support one or more VMs so that the VMs are executing on the physical computer systems. The host computers may be servers that are commonly found in data centers. As an example, the host computers may be servers installed in one or more server racks. Typically, the host computers of a cluster are located within the same server rack.

Each of the cluster management servers 110 in the clusters C-1, C-2 . . . C-N operates to monitor and manage the host computers H-1, H-2 . . . H-M in the respective cluster. Each cluster management server may be configured to monitor the current configurations of the host computers and the VMs running on the host computers, for example, virtual machines (VMs), in the respective cluster. The monitored configurations may include the hardware configuration of each of the host computers, such as CPU type and memory size, and/or software configurations of each of the host computers, such as operating system (OS) type and installed applications or software programs. The monitored configurations may also include VM hosting information, i.e., which VMs are hosted and running on which host computers. The monitored configurations may also include VM information. The VM information may include the size of each of the VMs, virtualized hardware configurations for each of the VMs, such as virtual CPU type and virtual memory size, software configurations for each of the VMs, such as OS type and installed applications or software programs running on each of the VMs, and virtual storage size for each of the VMs. The VM information may also include resource parameter settings, such as demand, limit, reservation and share values for various resources, e.g., CPU, memory, network bandwidth and storage, which are consumed by the VMs. The demands of the VMs for the consumable resources are determined by the host computers hosting the VMs by monitoring the current usage of resources by the VMs, e.g., CPU processing usage, memory usage, network usage and/or storage usage, and provided to the respective cluster management server.

In some embodiments, the cluster management servers 110 may be implemented on separate physical computers. In other embodiments, the cluster management servers may be implemented as software programs running on a host computer or on virtual computers running on a host computer (now shown). In an implementation, the cluster management servers are VMware vCenter™ servers with at least some of the features available for such servers and each resource management module (RMM) 112 is a VMware Distributed Resource Scheduler™, which provides a Distributed Resource Scheduler (DRS) service as is known in the field.

The network 102 can be any type of computer network or a combination of networks that allows communications between devices connected to the network using, for example, a TCP or UDP transport layer. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The datastore cluster 104 is used to store data for the host computers of the clusters C-1, C-2 . . . C-N, which can be accessed like any other type of storage device commonly connected to computer systems. In an embodiment, the datastore cluster can be accessed by entities, such as VMs running on the host computers, using any file system, e.g., virtual machine file system (VMFS) or network file system (NFS). The datastore cluster includes one or more computer data storage devices 116, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The datastore cluster includes a storage management module 118, which manages the operation of the datastore cluster. In an embodiment, the storage management module is a computer program executing on one or more computer systems (not shown) of the datastore cluster. The datastore cluster supports multiple datastores DS-1, DS-2 . . . DS-X (where X is a positive integer), which may be identified using logical unit numbers (LUNs). In an embodiment, the datastores are virtualized representations of storage facilities. Thus, each datastore may use resources from more than one storage device included in the datastore cluster. The datastores are used to store data associated with the VMs supported by the host computers of the clusters C-1, C-2 . . . C-N. For virtual machines, the datastores may be used as virtual storage or virtual disks to store files needed by the virtual machines for operation. One or more datastores may be associated with one or more clusters. In an embodiment, the same datastore may be associated with more than one cluster.

Figure 2:
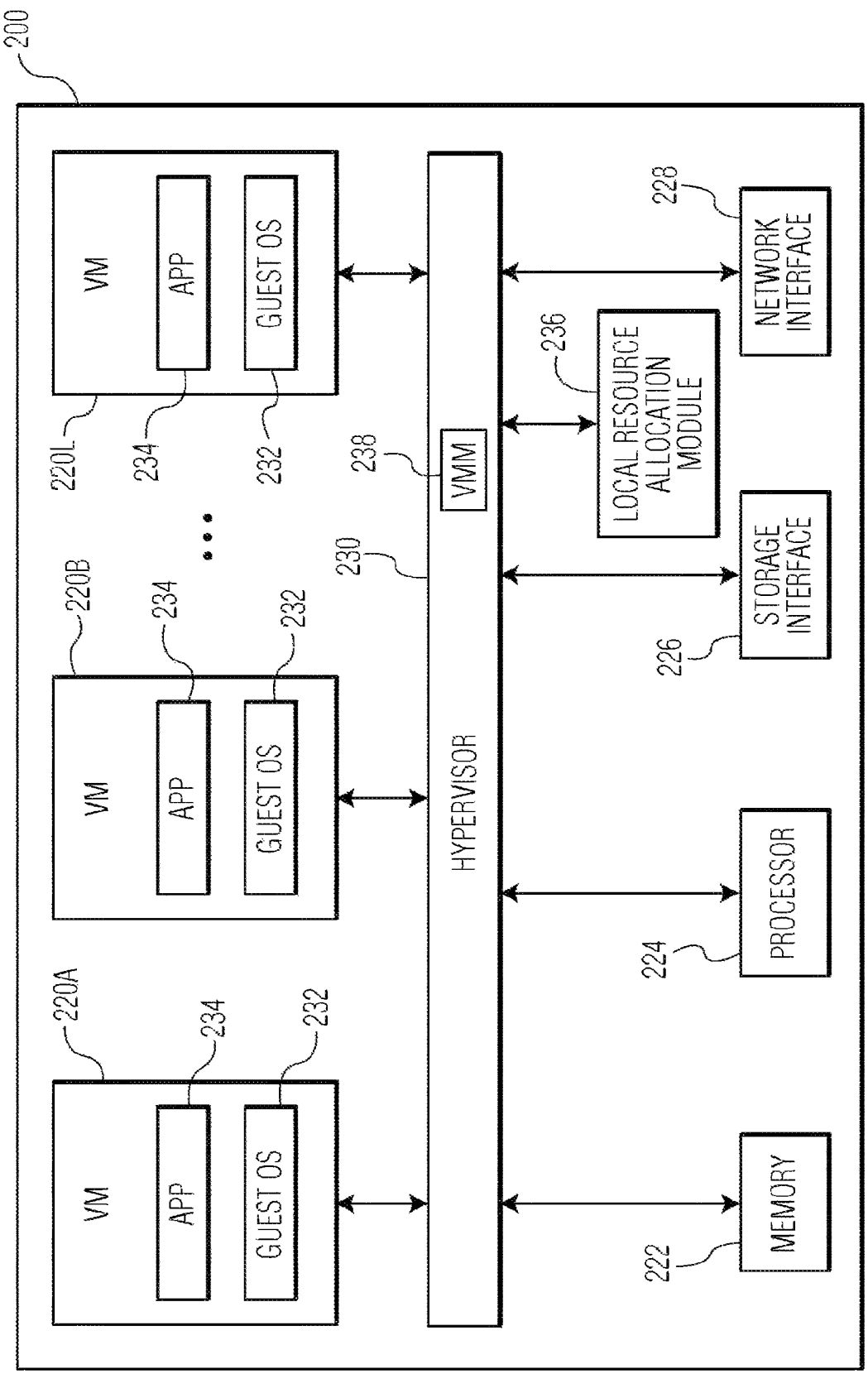
FIG. 2 is a block diagram of a host computer from the virtual machine network of FIG. 1.

Turning now to FIG. 2, components of a host computer 200 that is representative of the host computers H-1, H-2 . . . H-M, are shown. In FIG. 2, the physical connections between the various components of the host computer are not illustrated. In the illustrated embodiment, the host computer is configured to support a number of VMs 220A, 220B . . . 220L (where L is a positive integer). The number of VMs supported by the host computer can be anywhere from one to more than one hundred. The exact number of VMs supported by the host computer is limited by the physical resources of the host computer or other constraints such as licensing. The VMs share at least some of the hardware resources of the host computer, which includes system memory 222, one or more processors 224, a storage interface 226, and a network interface 228. The system memory 222, which may be random access memory (RAM), is the primary memory of the host computer. The processor 224 can be any type of processor, such as a central processing unit (CPU) commonly found in a server. The storage interface 226 is an interface that allows the host computer to communicate with the datastore cluster 104 in FIG. 1. As an example, the storage interface may be a host bus adapter or a network file system interface. The network interface 228 is an interface that allows the host computer to communicate with other devices in the cluster as well as devices connected to the network 102 in FIG. 1. As an example, the network interface may be a network adapter. The guest operating system is a master control program of the guest VM and, among other things, forms a software platform on top of which guest applications run. In an embodiment, guest applications are individual programs such as, for example, an email manager, a system logger, or another program with which a user directly communicates.

In the embodiment of FIG. 2, the VMs 220A, 220B . . . 220L run on top of a hypervisor 230 that includes a kernel (not shown). In other embodiments, one or more of the VMs can be nested, i.e., a VM running in another VM. For example, one of the VMs may be running in a VM, which is also running in another VM. The hypervisor may run on top of the host computer's operating system or directly on hardware of the host computer. With the support of the hypervisor, the VMs provide virtualized computer systems that give the appearance of being distinct from the host computer and from each other.

Similar to any other computer system connected to the network 102 in FIG. 1, the VMs 220A, 220B . . . 220L shown in FIG. 2 are able to communicate with other computer systems connected to the network using the network interface 228 of the host computer 200. In addition, the VMs are able to access the datastore cluster 104 in FIG. 1 using the storage interface 226 of FIG. 2 of the host computer.

The host computer 200 also includes a local resource allocation module 236 that operates as part of a resource management system, such as a distributed resource scheduler system, to manage resources consumed by the VMs 220A, 220B . . . 220L. The local resource allocation module in each host computer cooperatively operates with the local resource allocation modules in the other host computers of the network computer system 100 to generate resource allocation settings and perform resource scheduling, which includes balancing the loads of software processes and/or storage resource scheduling, among the host computers H-1, H-2 . . . H-M of the host computer clusters C-1, C-2 . . . C-N. Although the local resource allocation module is illustrated in FIG. 2 as being separate from the hypervisor 230, the local resource allocation module may be implemented as part of the hypervisor. In some embodiments, the local resource allocation module is implemented as software programs running on the host computer. However, in other embodiments, the local resource allocation module may be implemented using any combination of software and hardware.

Figure 3:
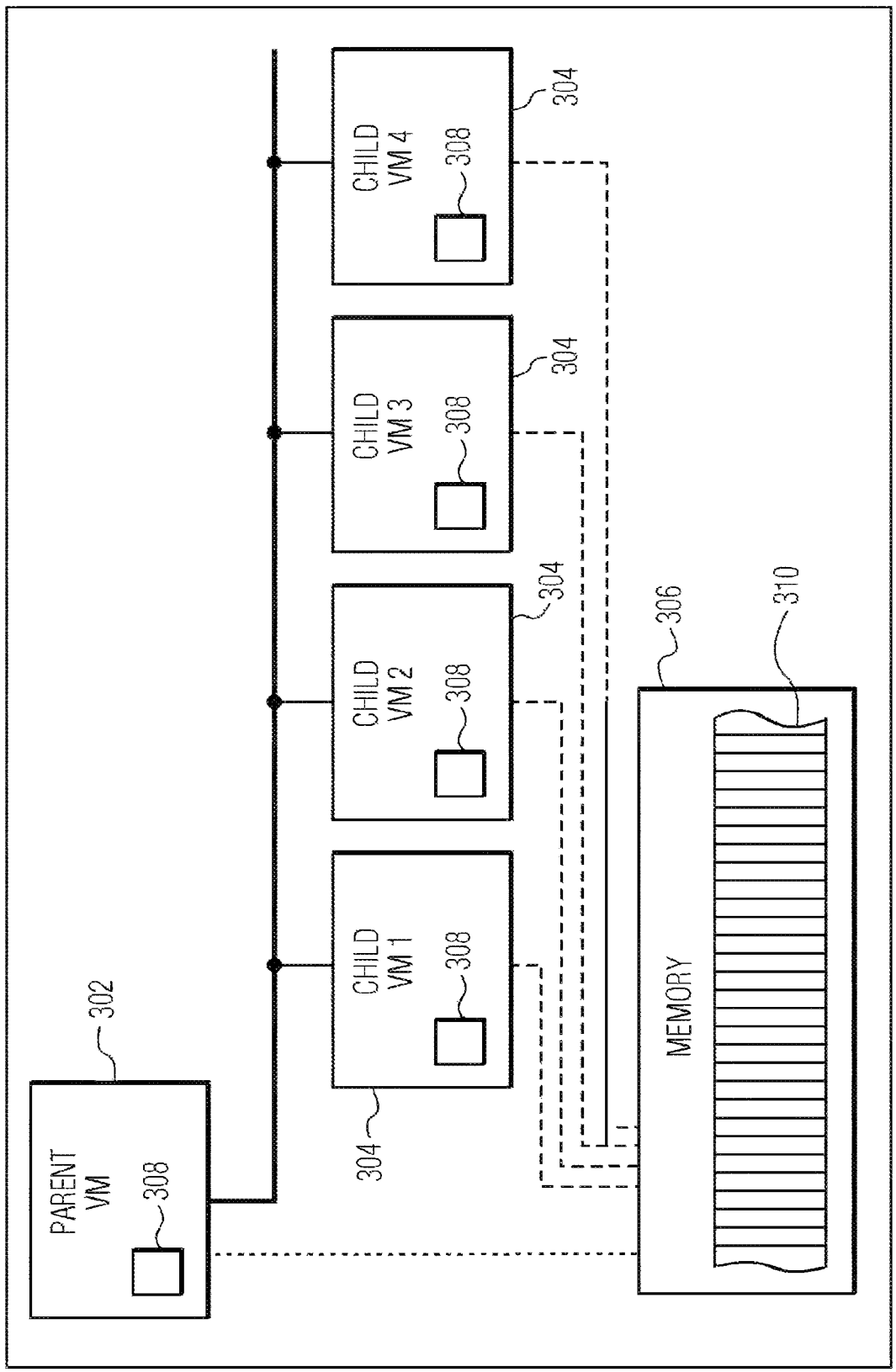
FIG. 3 illustrates a parent virtual machine supporting a process with several child VMs cloned from the parent virtual machine to assist in supporting the process.

A VM in a host computer as described above with reference to FIG. 2 can be configured to support a process for handling a given workload. FIG. 3 is a block diagram of a host computer configured to run a set of VMs supporting a process for handling a given workload. As shown in FIG. 3, the host computer includes a parent VM 302, four child VMs 304, and memory 306 used by the VMs. Typically, when a host computer is configured to support a process, the first VM instantiated to support the process is referred to as the "parent VM." In the example of FIG. 3, when the parent VM is instantiated and configured, the configuration is stored in a configuration file 308 that directs the parent VM to access select pages 310 of memory in the memory of the host computer or from another shared memory source. The parent VM handles the workload until a predefined point, referred to as a "fork point," is reached and, once the fork point is reached, additional VMs, referred to as "child VMs" are cloned from the parent VM (i.e., instantiated with the same configuration file as the parent VM) to assist in supporting the parent VM. For example, as illustrated in FIG. 3, the configuration file of the parent VM is copied to each of the child VMs and the child VMs are directed to also use pages in the memory of the host computer or the shared memory source. Thus, initially, a parent VM is instantiated to support processing a new workload and the configuration file directs the parent VM to utilize pages in the memory of the host computer or the shared memory source. After a parent process performs some initial computations on the workload, a fork point is reached and child VMs are instantiated to run child processes to further modify the results of the initial computations or to increase the number of VMs processing the workload. The child VMs are instantiated with the same configuration file as the parent VM and are directed to use pages of the memory of the host computer or the shared memory source as well.

Instantiating child VMs to further modify the results of the initial computations or to increase the number of VMs supporting a process can produce significant savings in resource consumption as well as increased throughput. However, increasing the number of VMs available to support a process is not without cost. Each child VM is instantiated with the same configuration (e.g., same amount of memory) as the parent VM. Thus, among other resources required, the total amount of memory required by VMs supporting a process increases proportional to the number of VMs. For example, the amount of memory needed can be calculated as follows:

$$\text{Total Memory}=n*\text{MemSize}$$

where n equals the number of VMs supporting the process and MemSize equals the amount of memory required by the parent VM. By instantiating each child VM with a fixed amount of memory, the amount of memory needed can grow very large.

Figure 4:
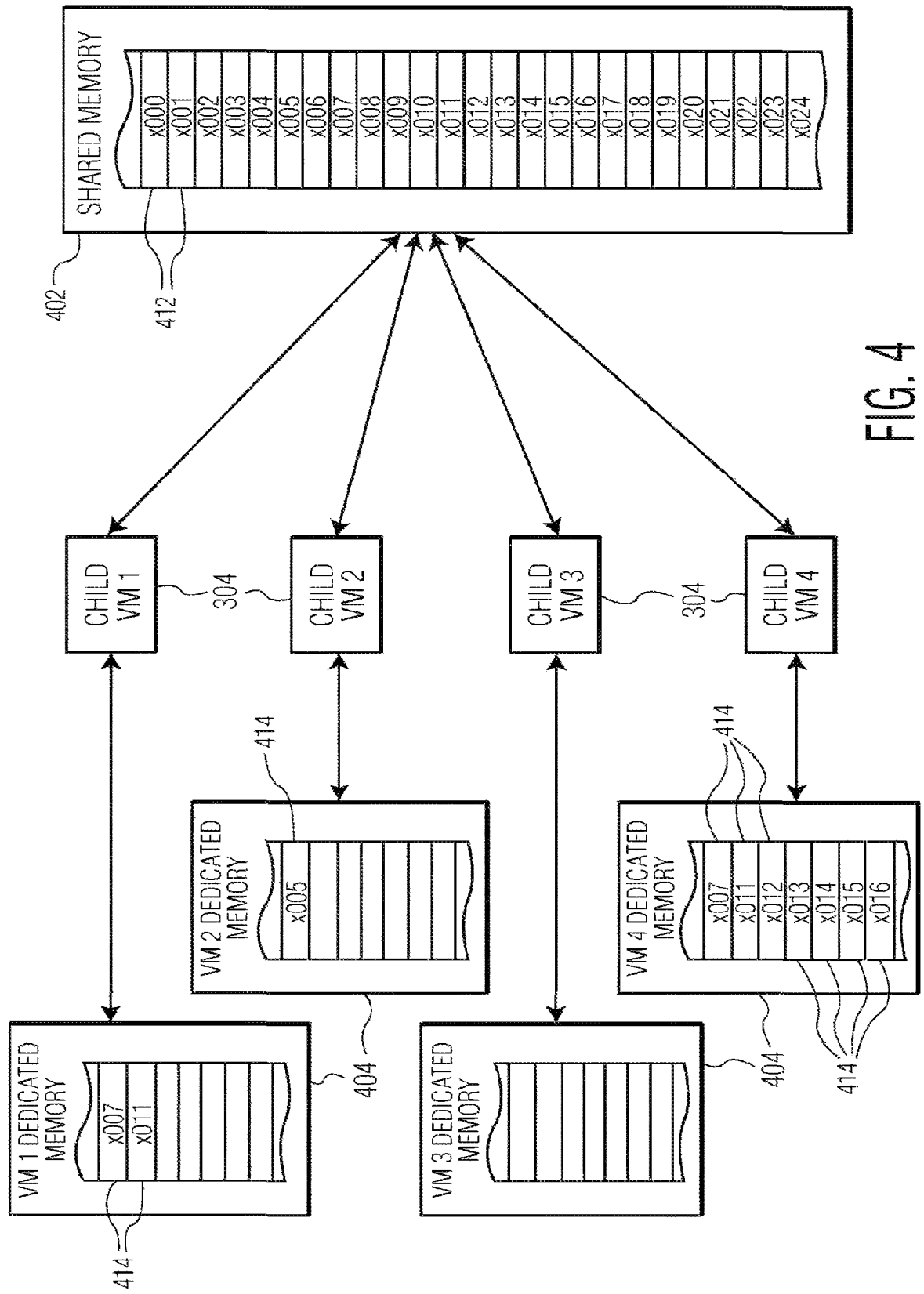
FIG. 4 is a block diagram illustrating the memory usage by the child VMs of FIG. 3.

In order to reduce the amount of memory needed, the child VMs can be configured to share the memory pages of the parent VM and, if one of the child VMs needs to write to a page, a page of the shared memory pages can be copied to dedicated memory for the child VM when the VM needs to write to the page. FIG. 4 is a block diagram illustrating memory usage by the child VMs of FIG. 3. In the block diagram of FIG. 4, the child VMs 304 each use shared memory 402 and dedicated memory 404. The shared memory and dedicated memory are made up of pages 412, 414 of memory as indicated by the indexed slices. When a child VM needs to read a page in the shared memory, the child VM accesses the page in the shared memory. Alternatively, when the child VM attempts to write to the page, the child VM creates a copy of the page 412 from the shared memory into the dedicated memory for the child VM and writes to the copied page 414 in the dedicated memory. Thus, rather than creating full copies of all the pages in the shared memory for each child VM, copies of pages from the shared memory can be created as needed for each child VM. For example, in FIG. 4, when child VM 1 needs to write to pages x007 and x011, each page is copied into the dedicated memory for VM 1 and child VM 1 writes to the copied pages in its dedicated memory.

By sharing pages of memory, the amount of memory needed by all VMs instantiated to support the process can be calculated as follows:

$$\text{Total Memory}=(n*(1-Ll))*\text{MemSize}$$

where n equals the number of VMs supporting the process, Ll equals the percentage of pages shared by the VMs supporting the process, and MemSize equals the amount of memory required by the parent VM. Thus, sharing pages of memory requires a fraction of the memory that is required when all of the pages of memory for each VM are copied. For example, in FIG. 4, rather than requiring 100 pages of memory (i.e., a complete copy of the 25 pages of shared memory for each child VM), only 35 pages of memory are required (i.e., one copy of the 25 pages of shared memory, 2 pages of dedicated memory for child VM 1, 1 page of dedicated memory for child VM 2, and 7 pages of dedicated memory for child VM 4).

While using shared memory reduces the amount of memory needed by parent and child VMs, in order for a child VM to use the shared pages of memory, the child VM must be able to access the same memory as other VMs sharing the pages. Typically, VMs running on the same host computer can all access the same memory while VMs stored on different host computers may not be able to access the same memory. Thus, if additional child VMs needed to support the parent process are created on, or migrated to, a host computer that is unable to access the same memory as the parent VM, then memory pages cannot be shared with the additional child VMs.

While VMs on the same host computer as the parent VM or using the same shared memory source can share memory pages, not all VMs will share the same amount of memory pages (e.g., one child VM may not require any pages to be copied to its dedicated memory while another child VM can require many pages to be copied to its dedicated memory). As a result, some child VMs will require less memory than others. For example, in FIG. 4, child VM 3 does not write to any pages of memory and, therefore, does not require dedicated pages of memory in addition to the pages from the shared memory, whereas child VM 4 writes to seven pages of memory and requires seven pages of dedicated memory in addition to the pages from the shared memory.

If more child VMs are instantiated than can be supported by a single host computer, then some child VMs will need to be separated from other child VMs. In accordance with an embodiment of the invention, if it is determined that a VM needs to be separated from the other VMs, a VM will be selected based on the number of memory pages that have been changed (e.g., the number of pages copied to the VM's dedicated memory). For example, the number of pages copied to the dedicated memory is used as an indicator to determine how to best migrate VMs. In an embodiment, the VM that has changed the highest number of memory pages (e.g., copied the highest number of pages to its dedicated memory) will be selected and separated onto a separate host computer. Thus, by selecting a VM that has changed the highest number of memory pages from a set of VMs supporting a process and separating that VM onto a separate host computer, more memory will be made available to the other VMs supporting the process than if a VM that has changed fewer memory pages were selected and separated.

FIG. 5 is a flow diagram of a technique for managing the placement of VMs in a virtual machine network. At decision point 502, it is determined whether a process running in a VM on a first host computer needs an additional VM to help support the process. In an embodiment, the determination is made by a DRS running in a cluster in which the host computer is located. If an additional VM is needed (i.e., a child VM), at decision point 504, it is determined whether an additional VM can be added to the first host computer. If an additional VM can be added to the first host computer, then, at block 506, an additional VM is instantiated on the first host computer, the VM is added to the set of VMs supporting a process, and the flow returns to decision point 502. In an embodiment, the instantiated VM is a child VM cloned from a parent VM already running on the first host computer (i.e., has the same configuration file as the VM already running on the first host computer). Alternatively, if a VM cannot be added to the first host computer, then, at block 508, the number of memory pages changed by each VM running on the first host computer is calculated. At block 510, a VM is selected to be separated from the other VMs based on the number of memory pages changed. In an embodiment, the VM that has changed the highest number of memory pages is selected. In another embodiment, at least one VM that has changed a number of memory pages in excess of a predefined threshold is selected. For example, if a user sets a threshold at 20%, then at least one of several VMs that have changed 20% or more memory pages is selected. Once a VM has been selected, the VM is separated from the other VMs in the set of VMs supporting the process and the flow returns to decision point 504 to determine if the needed additional VM can now be added to the first host computer. If the additional VM still cannot be added, then the steps for selecting a VM to be separated are repeated.

Figure 6A:
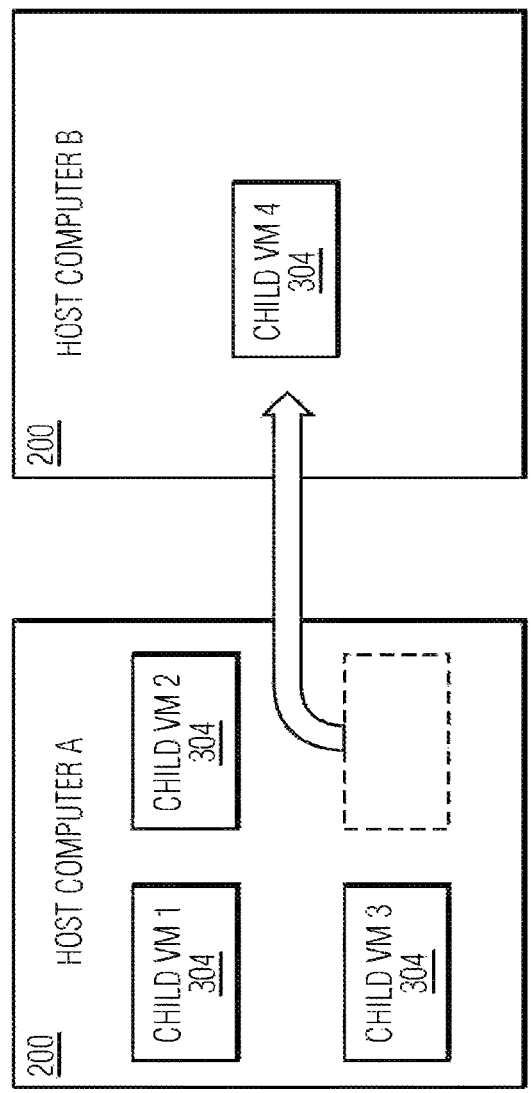
FIG. 6A illustrates separating a VM from other VMs supporting a process by migrating the VM to a second host computer in accordance with an embodiment of the invention.
Figure 6B:
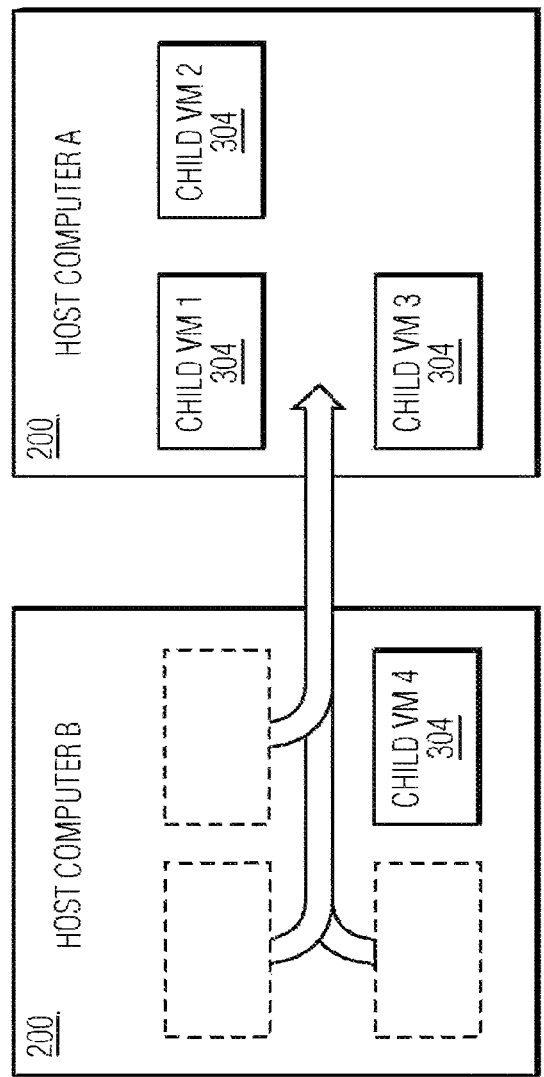
FIG. 6B illustrates separating a VM from other VMs supporting a process by migrating the other VMs to a second host computer in accordance with an embodiment of the invention.

In accordance with an embodiment of the invention, a VM can be separated from the other VMs in many ways. FIG. 6A depicts a first way of separating a VM from other VMs. In FIG. 6A, child VM 1 304, child VM 2 304, child VM 3 304, and child VM 4 304 run on host computer A 200. As described above with reference to FIG. 4, child VM 4 has changed the highest number of memory pages. In accordance with an embodiment of the invention, child VM 4 is selected and separated from child VM 1, child VM 2, and child VM 3 by being migrated to host computer B 200. FIG. 6B depicts a second way of separating a VM from other VMs. In FIG. 6B, child VM 1 304, child VM 2 304, child VM 3 304, and child VM 4 304 run on host computer A 200. As described above with reference to FIG. 4, child VM 4 has changed the highest number of memory pages and, therefore, is selected to be separated from the other VMs in the set of VMs supporting the process. In accordance with an embodiment of the invention, child VM 4 is selected and separated from child VM 1, child VM 2, and child VM 3 by migrating child VM 1, child VM 2, and child VM 3 to host computer B 200.

Thus, when an additional VM is needed, separating VMs making fewer changes to memory pages, referred to as having a "low dirtying rate," is favored over separating VMs making many changes to memory pages, referred to as having a "high dirtying rate." By favoring VMs with a low dirtying rate, less dedicated memory is needed in addition to the shared memory, allowing for less memory to be used by the VMs.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer usable storage medium for execution by a computer. As an example, an embodiment of a computer program product includes a computer usable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-usable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

Therefore, the following is claimed:

1. A method for managing placement of a set of virtual machines in a virtual machine network, comprising:
creating a parent virtual machine on a first host computing device;
creating a plurality of cloned virtual machines from the parent virtual machine, the cloned virtual machines and the parent virtual machine using a shared memory,
concurrently executing the plurality of cloned virtual machines, wherein a subset of the plurality of cloned executing virtual machines, independently, perform 1) creating a copy of a page of the shared memory as a dedicated memory page associated with the respective individual cloned virtual machine and 2) writing to the associated dedicated memory page;
subsequent to the concurrent execution, determining a capability of the first host computing device to support an additional virtual machine;
in response to determining that the first host computing device is not capable of supporting the additional virtual machine, selecting from the plurality of cloned virtual machines a cloned virtual machine that has the highest number of dedicated memory pages of the shared memory;
migrating the cloned virtual machine that has the highest number of dedicated memory pages of the shared memory from the first host computing device to a second host computing device and leaving at least one remaining cloned virtual machine from the plurality of cloned virtual machines on the first host computing device; and
reclaiming the dedicated memory pages of the migrated cloned virtual machine to allow the placement of the additional virtual machine.

2. The method of claim 1, wherein the parent virtual machine is created on the first host computing device based at least in part on a configuration file, the configuration file comprising instructions to access the shared memory.

3. The method of claim 2, wherein the plurality of cloned virtual machines are created from the parent virtual machine based at least in part on the configuration file.

4. The method of claim 1, wherein the parent virtual machine is created to support a process on the first host computing device.

5. The method of claim 4, wherein the plurality of cloned virtual machines are created from the parent virtual machine in response to reaching a predefined point in the process on the first host computing device.

6. The method of claim 4, wherein the capability of the first host computing device is determined in response to determining that the additional virtual machine is needed to support the process supported by the parent virtual machine.

7. A system for managing placement of a set of virtual machines in a virtual machine network, comprising:
at least one computing device comprising a processor and a memory; and
machine-readable instructions stored in the memory that, when executed by the processor, cause the at least one computing device to at least:
create a parent virtual machine on a first host computing device;
create a plurality of cloned virtual machines from the parent virtual machine, the cloned virtual machines and the parent virtual machine using a shared memory;
concurrently execute the plurality of cloned virtual machines, wherein a subset of the plurality of cloned executing virtual machines, independently, perform 1) creating a copy of a page of the shared memory as a dedicated memory page associated with the respective individual cloned virtual machine and 2) writing to the associated dedicated memory page;
subsequent to the concurrent execution, determine a capability of the first host computing device to support an additional virtual machine;
in response to determining that the first host computing device is not capable of supporting the additional virtual machine, select from the plurality of cloned virtual machines a cloned virtual machine that has the highest number of dedicated memory pages of the shared memory;
migrate the cloned virtual machine that has the highest number of dedicated memory pages of the shared memory from the first host computing device to a second host computing device and leaving at least one remaining cloned virtual machine of the plurality of cloned virtual machines on the first host computing device; and
reclaim the dedicated memory pages of the migrated cloned virtual machine to allow the placement of the additional virtual machine.

8. The system of claim 7, wherein the parent virtual machine is created on the first host computing device based at least in part on a configuration file, the configuration file comprising instructions to access the shared memory.

9. The system of claim 8, wherein the plurality of cloned virtual machines are created from the parent virtual machine based at least in part on the configuration file.

10. The system of claim 7, wherein the parent virtual machine is created on the first host computing device to support a process on the first host computing device.

11. The system of claim 10, wherein the plurality of cloned virtual machines are created from the parent virtual machine in response to reaching a predefined point in the process on the first host computing device.

12. The system of claim 7, wherein the capability of the first host computing device is determined in response to determining that the additional virtual machine is needed to support the process on the first host computing device.

13. A non-transitory computer-readable medium comprising machine-readable instructions for managing placement of a set of virtual machines in a virtual machine network, the machine-readable instructions, when executed by a processor of at least one computing device, causing the at least one computing device to at least:
create a parent virtual machine on a first host computing device;
create a plurality of cloned virtual machines from the parent virtual machine, the cloned virtual machines and the parent virtual machine using a shared memory;
concurrently execute the plurality of cloned virtual machines, wherein a subset of the plurality of cloned executing virtual machines, independently, perform 1) creating a copy of a page of the shared memory as a dedicated memory page associated with the respective individual cloned virtual machine and 2) writing to the associated dedicated memory page;
subsequent to the concurrent execution, determine a capability of the first host computing device to support an additional virtual machine;
in response to determining that the first host computing device is not capable of supporting the additional virtual machine, select from the plurality of cloned virtual machines a cloned virtual machine that has the highest number of dedicated memory pages of the shared memory;
migrate the cloned virtual machine that has the highest number of dedicated memory pages of the shared memory from the first host computing device to a second host computing device and leaving at least one remaining cloned virtual machine of the plurality of cloned virtual machines on the first host computing device; and
reclaim the dedicated memory pages of the migrated cloned virtual machine to allow the placement of the additional virtual machine.

14. The non-transitory computer-readable medium of claim 13, wherein the parent virtual machine and the plurality of cloned virtual machines are created based at least in part on a configuration file, the configuration file comprising instructions to access the shared memory.

15. The non-transitory computer-readable medium of claim 14, wherein the parent virtual machine is created on the first host computing device to support a process on the first host computing device.

16. The non-transitory computer-readable medium of claim 15, wherein the plurality of cloned virtual machines are created from the parent virtual machine in response to reaching a predefined point in the process on the first host computing device.

17. The non-transitory computer-readable medium of claim 15, wherein the capability of the first host computing device is determined in response to determining that the additional virtual machine is needed to support the process on the first host computing device.

* * * * *